US012798110B2

(12) United States Patent
Akey et al.

(10) Patent No.: US 12,798,110 B2
(45) Date of Patent: Nov. 17, 2026

(54) MULTI-STATION COLLABORATIVE ROBOT WELDING AND CUTTING FABRICATION SYSTEM AND METHODS

(71) Applicant: Vectis Automation, LLC, Loveland, CO (US)

(72) Inventors: Andrew Akey, Windsor, CO (US); Joshua Pawley, Windsor, CO (US); Douglas Rhoda, Timnath, CO (US); Todd Scrapella, Fort Collins, CO (US); Brendan DeJonge, Fort Collins, CO (US)

(73) Assignee: Vectis Automation, LLC, Loveland, CO (US)

( * ) Notice: Subject to any disclaimer, the term of this patent is extended or adjusted under 35 U.S.C. 154(b) by 0 days.

(21) Appl. No.: 18/827,784

(22) Filed: Sep. 8, 2024

(65) Prior Publication Data

US 2025/0083328 A1 Mar. 13, 2025

Related U.S. Application Data

(60) Provisional application No. 63/581,471, filed on Sep. 8, 2023.

(51) Int. Cl.

| | |
|---|---|
| ***B25J 11/00*** | (2006.01) |
| ***B25J 9/16*** | (2006.01) |
| ***B25J 13/06*** | (2006.01) |

(52) U.S. Cl.

CPC ............ *B25J 11/005* (2013.01); *B25J 9/163* (2013.01); *B25J 13/06* (2013.01); *B25J 9/1679* (2013.01)

(58) Field of Classification Search

None

See application file for complete search history.

(56) References Cited

U.S. PATENT DOCUMENTS

| | | | | |
|---|---|---|---|---|
| 5,921,159 | A * | 7/1999 | Watkins | B23B 29/242 408/35 |
| 2006/0108342 | A1 * | 5/2006 | Samodell | B23K 9/323 219/125.1 |
| 2018/0304391 | A1 * | 10/2018 | Kotera | B23K 9/1278 |
| 2024/0391091 | A1 * | 11/2024 | Nighswander | B25J 9/162 |
| 2025/0041980 | A1 * | 2/2025 | Barglof | B23Q 7/048 |

FOREIGN PATENT DOCUMENTS

| | | | | |
|---|---|---|---|---|
| CN | 108233650 A | * | 6/2018 | H02K 5/08 |

OTHER PUBLICATIONS

Translation of CN-108233650-A (Year: 2018).*

* cited by examiner

*Primary Examiner* — Elizabeth M Kerr

(74) *Attorney, Agent, or Firm* — Glenn H. Lenzen; Elevated IP, LLC

(57) ABSTRACT

A highly mobile multi-station collaborative robot fabrication system for the assembly, construction, fabrication, and/or the completion of weldments or performing cutting operations in fabrication shop or factory environments or on large structures in difficult to access or elevated locations and methods of deploying and operating the system.

14 Claims, 9 Drawing Sheets

MULTI-STATION COLLABORATIVE ROBOT WELDING AND CUTTING FABRICATION SYSTEM AND METHODS

CROSS-REFERENCE TO RELATED APPLICATIONS

This application claims priority to U.S. Provisional Patent Application Ser. No. 63/581,471 filed on Sep. 8, 2023, the entire contents of which are incorporated herein by reference.

FIELD OF THE INVENTION

The present invention relates generally to fabrication systems for manufacturing metal parts and assemblies. More specifically, the present invention relates to robot welding and cutting fabrication systems, and in particular to collaborative robot welding and cutting systems. In particular, the present invention relates to a readily re-deployable multi-station collaborative robotic welding and cutting system adaptable for intuitive programming and operation by an operator without requiring specialized and extensive training and methods for fabricating a weldment and for producing precise structural components from raw work materials therewith.

BACKGROUND OF THE INVENTION

During the course of the last one hundred and twenty years, electric arc welding has evolved from the use of essentially a bare electrode employed to create molten metal by generating an electric arc between one end of the electrode and a workpiece to complex, highly-automated systems designed to fabricate complex structures from both ferrous and non-ferrous base metal alloys. The physical properties, chemical composition, sensitivity to oxidation and heat transfer characteristics of various alloys demand close attention to materials joining techniques used to create sound weldments in a wide variety of structures and products. Consumer awareness of the science, engineering and ingenuity involved in modern manufacturing is not widespread. Examples of welded structures extend at one end of the spectrum from commonplace household appliances, furniture, exercise and lawn maintenance equipment to expensive and sophisticated space and airborne platforms, military equipment, scientific apparatus, chemical processing systems and medical devices fabricated from exotic metals. The list is endless.

Welding engineering is a highly-specialized discipline which requires knowledge of not only structures, materials and manufacturing processes, but also knowledge of specific welding processes and associated parameters including weld joint configuration, arc length, wire feed rate, travel speed, welding power supply settings such as arc voltage and current, shielding gas composition, preheat and post heat requirements, weaving parameters and other variables. A knowledgeable welder may assess the requirements of a particular job based upon prior experience and may adjust one or more of the foregoing parameters to achieve the desired weld penetration and weld bead configuration. Proper weld joint preparation likewise requires detailed knowledge of materials properties, cutting process selection, preheat and post heat requirements as needed to prevent cracking, and other variables. A knowledgeable and experienced metal processing worker such as a machinist or a welder may assess the requirements of a particular job based upon prior experience and may adjust one or more of the foregoing parameters to achieve the desired edge configuration with the precision required for proper assembly or to achieve the desired weld penetration and weld bead configuration from both a functional and an aesthetic perspective. However, a less experienced individual may not be able to set up a weld job without performing trial and error runs on test pieces, a process which is time consuming, inefficient, and costly.

Optimal weld quality depends not only on proper welding parameter settings, but also on physical consistency of the path and angle of the weld torch, intangibles which may be influenced by an individual welder's skills; variable situational influences including concentration, fatigue, and health issues; and operating environment factors such as heat, humidity, lighting and ventilation. These factors are particularly influential on weld quality where the welding process is performed with a hand-held electrode or torch. The same considerations apply to cutting operations.

Automated welding systems have been developed to enhance weld quality, consistency, and productivity by minimizing adverse effects of variable welding process parameter input and human performance. Automated systems typically replace the historical hand-held and guided coated or "stick" electrode process with automated continuous wire feed systems such as Gas Metal Arc Welding (GMAW), flux-cored arc welding (FCAW), gas tungsten arc welding (GTAW) or submerged arc welding (SAW) systems. The afore-mentioned automated processes may be used in connection with work-holding fixtures, weld head positioners and robot systems that can be programmed for specific welding applications. Nonetheless, if an operator enters incorrect parameter settings or fails to notice technical process irregularities during the course of fabricating a weldment, inevitably, scrap and rework will be the result. Even more serious is the possibility of catastrophic field failure of a welded structure, for example a bridge truss or an airframe, both of which may result in personal injury or loss of life.

Depending upon the application, automated robot welding systems can be massive assemblies requiring substantial acquisition and installation capital expenditures, dedicated floor space, safety systems, utility inputs for electrical power, hydraulics and/or cooling water; and overhead cranes or lateral material conveyance systems for work material and finished assembly transport. Although some prior art systems are designed for smaller manufacturing operations and may be moved from one location to another via forklift and pickup truck, the welding cell is not amenable for use with different welding systems (GMAW, GTAW, SAW, for example), high mix, low volume production, or movement within a manufacturing facility without potentially disrupting other operations.

Welding is so precise and the risks of property loss and/or personal injury to users of the welded structures so pervasive in modern society that the setup and identification of the input variables in both manual and computer-controlled robot weld fabrication operations, as well as the execution of the welding process applicable to a given application, require manual input, a process that draws upon the skills and experience of the individual welder performing the task. However, a severe lack of welders in today's workforce presents yet another challenge to meeting the demands of a highly consumptive economy. The American Welding Society estimates the average age of a welder to be 54 years old. The number of active welders is decreasing at a rate that is significantly higher than the entry rate of new welders into the field, and a potential shortage of approximately 500,000 welders in the United States is projected to exist by 2025. The situation is further exacerbated by socio-economic societal changes brought about by the expectations and demands of younger generations for higher paying jobs in what are viewed as the "high tech" fields of computer science, programming, communications and information technology and the like. Traditional jobs in manufacturing, agriculture, foundries and mining are now viewed as less desirable or have migrated off-shore.

Consequently, manufacturers are under tremendous stress to increase welding productivity through automation but currently have only risky and costly options to do so. Traditional robot welding solutions are a significant financial risk, bulky and expensive, with long delivery times, significant set-up time and cost, and what operations managers view as "well, no-turning-back now" risk. While larger corporations may be able to bear the cost and risk of traditional automation, the smaller shops that make up 75% of America's 250,000+ manufacturers are prohibited by the high capital investment requirements from availing themselves of the advantages offered by either partially or fully automated systems. Moreover, the problems associated with the fabrication of large structures is exacerbated by the challenge involved and difficulty of remotely deploying cobots or robots. Few practical means of welding on larger structures exist that do not require a large highly precise machine to position the cobot or robot. These machines are typically very expensive and are typically anchored to the concrete floor of a building or shop.

In view of the above, it is evident on the one hand that demands in the welding industry for reliable, consistent and repeatable welded structure fabrication processes may be satisfied by sophisticated and very costly automated systems that minimize the potentially adverse and unpredictable effects of human and process variables on weld quality. However, conflicting demands for relatively inexpensive, mobile and versatile welding systems capable of producing weldments of the highest quality that may also be and set up and operated by less experienced individuals in both high mix, low volume production environments and also on massive assemblies where the fabrication system may be positioned in uncomfortably elevated positions create a tension in the industry that heretofore has not been addressed by prior art systems.

Accordingly, it will be apparent to those skilled in the art from this disclosure that a need exists for collaborative robot fabrication systems such as welding and cutting systems that can be set up and programmed intuitively by an operator without the need for significant computer programming and coding training. A need also exists for a readily re-deployable and transportable automated welding system that may be installed in the field or in a manufacturing operation and moved from one worksite to another without significant labor or rigging or substantial acquisition and installation capital expenditures, dedicated floor space, or ancillary internal support and operating systems The present invention addresses aforementioned needs in the art as well as other needs, all of which will become apparent to those skilled in the art from the accompanying disclosure.

SUMMARY OF THE INVENTION

In accordance with the embodiments of the present invention, a highly-mobile collaborative robot fabrication system is disclosed for performing welding or cutting tasks related to the initial assembly, construction, fabrication and/or completion of weldments, including weld joint preparation, tack welding together components of a weldment, performing the welding tasks associated with a given weldment, and/or completing a partially finished welding project.

In an embodiment, a highly-mobile collaborative robot welding system contains a control system which enables an operator or a programmer to guide the robot to a preselected position in a weld path by hand.

In another embodiment a highly-mobile collaborative robot welding system includes a user interface or a teach pendant adapted to allow programming to be completed in an intuitive and graphical manner without requiring significant and specific education, training or computer programming and coding experience or skills.

In yet another embodiment, a highly-mobile collaborative robot welding system includes a mobile platform or cart adapted to be relocated without significant labor and/or rigging to bring the welding system to the work.

In still another embodiment, a highly-mobile collaborative robot welding system includes a collaborative robot welding arm operatively connected to a moveable base or cabinet, and a mobile platform or cart adapted to stow and transport the collaborative robot welding arm, the moveable base or cabinet, and welding system accessory equipment.

In yet another embodiment, the welding system accessory equipment includes a welding wire spool, a welding wire feed mechanism, and a control system for operating the collaborative robot welding system.

In still another embodiment, a highly-mobile collaborative robot welding system and mobile base are adapted to weld large stationary structures in indoor manufacturing and field service environments.

In yet another embodiment, the supporting surface is a workstation, a welded part, a structure, or an assembly.

In another embodiment, the programmable collaborative robot arm includes a built-in safety in the robot arm itself.

In another embodiment, a highly-mobile collaborative robot welding system provides enhanced production efficiency by allowing an operator to set up and complete more tasks through parallel and simultaneously performed operational steps and by shifting repetitive, monotonous welding tasks to the collaborative robot welding system.

In an embodiment, a highly-mobile collaborative robot cutting system is disclosed for performing cutting tasks related to cutting raw work materials of various shapes and thicknesses.

These and other features, aspects and advantages of the present invention will become apparent to those skilled in the art from the following detailed description of preferred embodiments taken in connection with the accompanying drawings, which are summarized briefly below.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
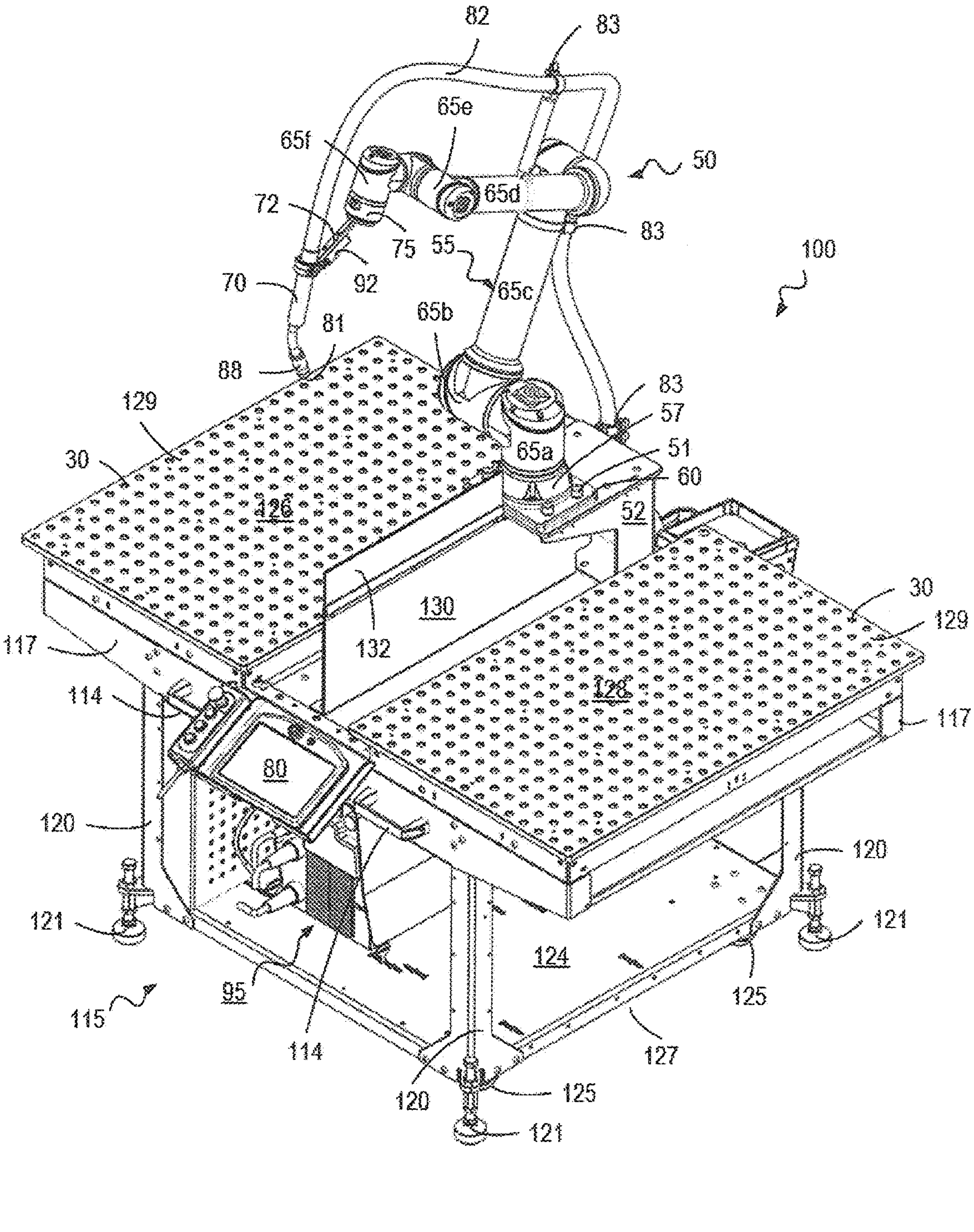
FIG. 1 is a front top perspective view of the elements of a highly-mobile collaborative robot welding system illustrating two separate workstations, each having a gridded planar worksurface in accordance with an embodiment of the present invention.
Figure 2:
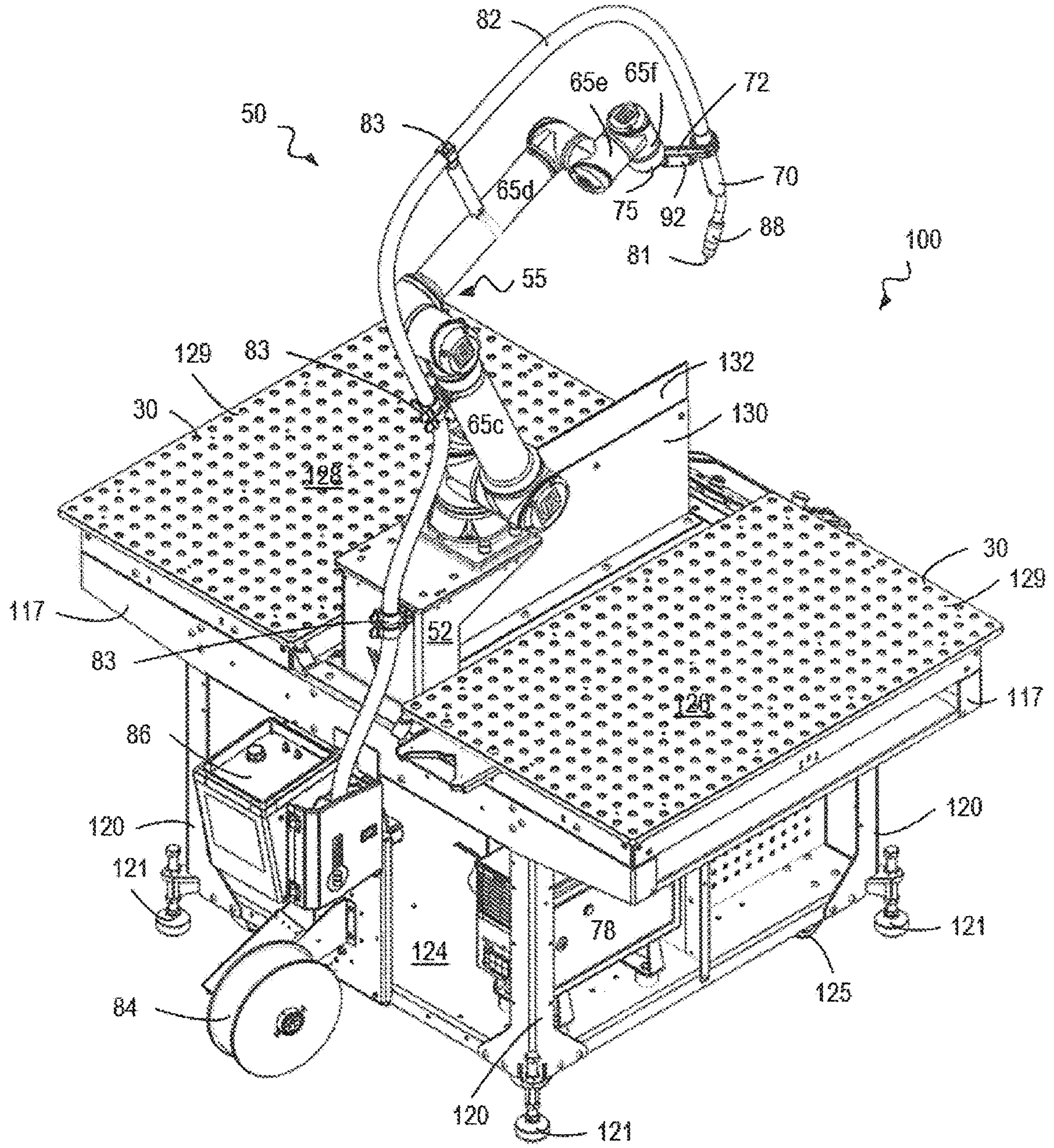
FIG. 2 is a rear top perspective view of the highly-mobile collaborative robot welding system of FIG. 1 in accordance with an embodiment of the present invention.
Figure 3:
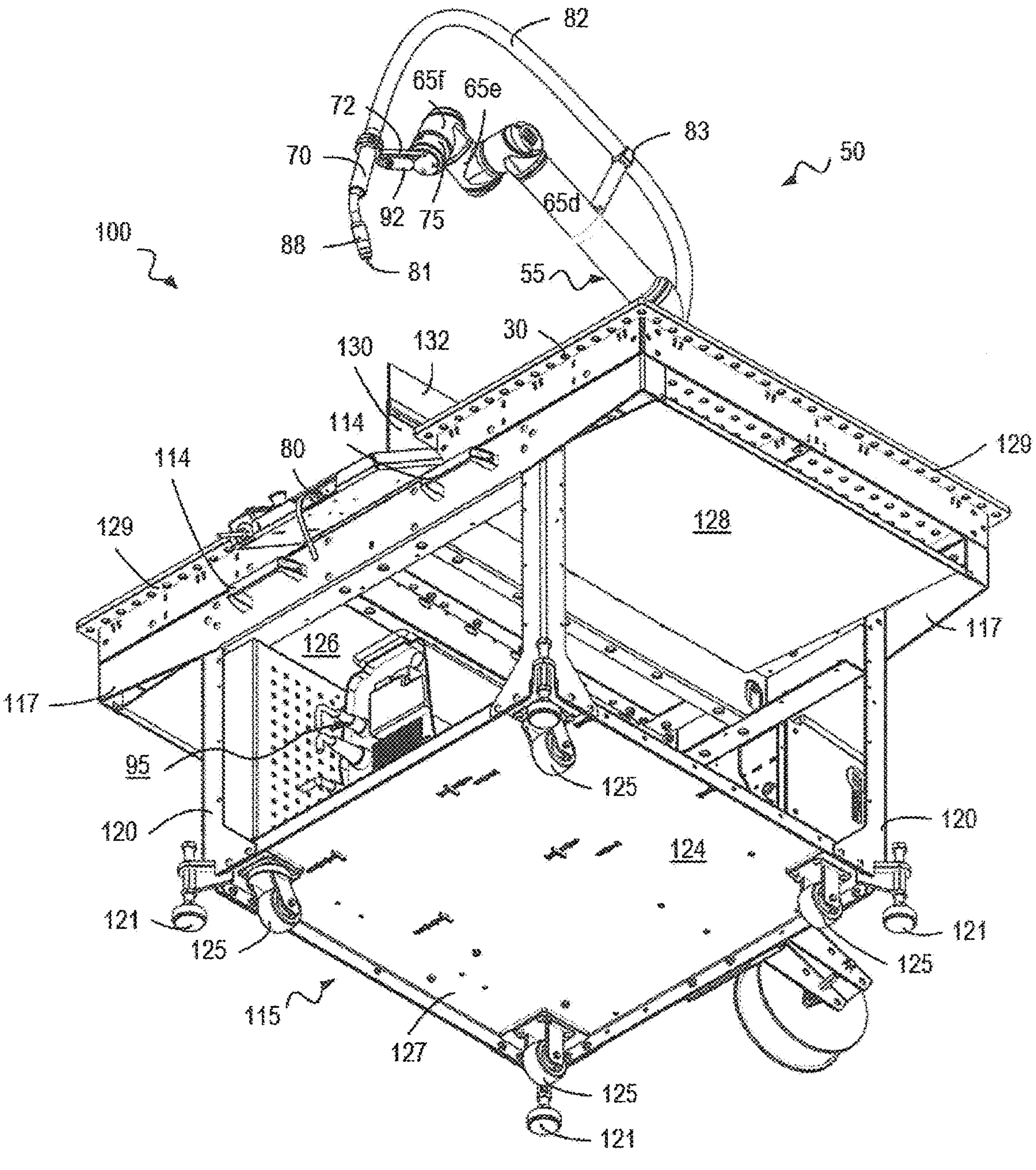
FIG. 3 is a front bottom perspective view of the highly-mobile collaborative robot welding system of FIG. 1 in accordance with an embodiment of the present invention.
Figure 4:
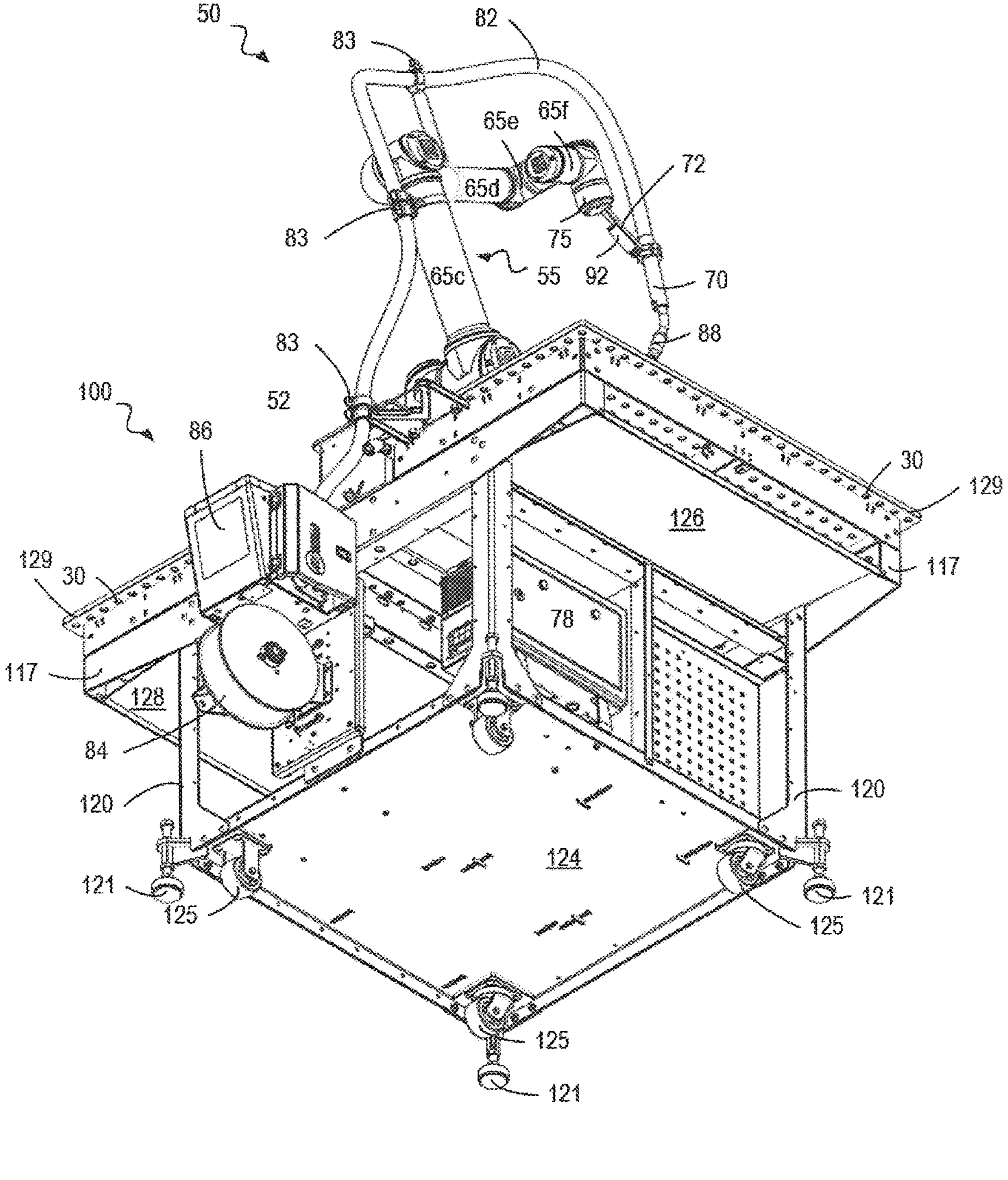
FIG. 4 is a rear bottom perspective view of the highly-mobile collaborative robot welding system of FIG. 1 in accordance with an embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claim and its equivalents.

Overview of Welding System

A highly-mobile collaborative robot fabrication system configured as a welding or a system having two separate workstations in accordance with an embodiment of the present invention addresses the afore-mentioned needs of the industry by providing a welding system that may be taken to the work material, set up, and placed in production in less than a few hours. The highly-mobile collaborative robot welding system includes a mobile platform or cart which supports a collaborative robot welding arm, also referred to herein as a cobot, programming and control systems and select ancillary equipment such as by way of example and not of limitation, a wire feed system, all of which is positioned on the cart. Cobots are lightweight in comparison to traditional robots. Accordingly, the mobile platform or cart and the fabricating equipment positioned thereon may be moved into position adjacent a large assembly or selectively and securely placed in position directly on the assembly for performing welding operations. Contrasted with the weight of much larger robotic systems, the lighter weight of the collaborative robot welding system of the instant invention makes this deployment method possible.

The highly-mobile collaborative robot welding system further includes a user interface or a teach pendant adapted to allow control system programming to be completed for any given job in an intuitive and graphical manner without requiring significant and specific education, training or computer programming/coding experience or skills. Accordingly, in a scarce labor market, where an extreme shortage of skilled welders exists, the collaborative robot welding system of the present invention permits manufacturers of welded products to meet the high demand for those products economically.

In operation, the operator/programmer either brings the work materials to be welded to the collaborative robot, for example in fabrication shop or factory environments, or, alternatively, brings the robot to the work material. If the collaborative robot is taken to the work material, the welder is plugged into available single phase or three phase wall power and the collaborative robot is plugged into an available 120V outlet. Once both devices are powered on, the operator/programmer starts positioning the collaborative robot for the work material to be welded on one or both of the separate workstations. The first positions that the operator/programmer will teach are clearance moves of the welding arm, designated as "AirMove's" to position the robot in preparation for the welding task at hand. The primary means of moving the collaborative robot and the welding gun to the work material is via a programming button that releases the robot into a hand-guided jogging mode where the operator/programming can push/pull the robot into the appropriate position. When the operator/programmer starts positioning the collaborative robot, he/she ensures they have a welding print or a welding procedure that will be used to identify the start point and the size and type of welding to be applied to the work material. If the desired work material will vary in positional location or the collaborative robot is moved to the work material, tactile searching/sensing is needed to ensure the trajectory of the robot is properly placed in the joint considering this variation. If one of these conditions exists, the operator/programmer plans out the searching scheme and weld path offsets if needed.

If searches are required to gather more data, the operator/programmer zeros out these searches treating the part to be welded as the baseline part for correlation of searches to all subsequent weld templates. Once the operator/programmer has added searches and appropriate offset activation, the appropriate weld templates can be added. Each of these welds may be a single segment linear weld, a single segment circular weld, or any additional segment combination to trace the shape of the welded component. The required welds might also be continuous welds, intermittent stitch welds, or multipass welds that take advantage of the programming technique referred to as storage and replay where the collaborative robot records the root pass and replays this on subsequent passes positionally offsetting each to achieve the desired weld size and shape. These various types of welds will be added using the built-in programming tools for each particular type of weld that is added. Once the welds have been added to the program, the operator/programmer selects the welding process that is needed and if the appropriate weld process is not in the system, the process will be developed using an existing set of data that is adjusted for a larger or smaller weld. The process of adding searches, if needed, and weld templates is repeated for all necessary welds across the work material to be welded. Between each of these sets of searches and weld templates any necessary AirMove's will be added to create a home or approach position, way points as needed, and a depart or end point and for clearance or conduit bundle cable management. Once all necessary moves have been added to the collaborative robot, the operator/programmer saves the program in the robot for future repetitive use. In either case where the work material was brought to the collaborative robot or the collaborative robot was taken to the work material, the position of the robot relative to the work material must be recorded or outlined on the floor of the production facility.

After a setup is completed at one of the workstations and processing, i.e., welding is initiated, an operator may proceed to make a setup on the second workstation and initiate a welding cycle. The operator will then return to the first workstation, remove the finished welded assembly, make a new setup, and start the welding cycle once more. The setup-process-remove cycle is repeated at each workstation until the particular welding job is completed, whereupon a fresh setup for a new job is made on each workstation, the processing parameters are programmed into the system, and the welding process is initiated.

Overview of System for Cutting

First, the operator/programmer either brings the work materials to be cut to the collaborative robot or, alternatively, brings the robot to the work material. If the mobile cart, the cutting system, and the collaborative robot are taken to the work material and moved into position adjacent a large assembly or selectively and securely placed in position directly on the assembly for performing cutting operations as described above in connection with a welding process. While the overview of the system operation is described in terms of a plasma cutting system, it is to be understood that other types of cutting systems may be used without departing from the scope of the present invention.

The plasma cutting system is plugged into available three phase wall power and the collaborative robot is plugged into an available 120V outlet. Once both devices are powered on, the operator/programmer starts positioning the collaborative robot for the work material to be plasma cut. The first positions that the operator/programmer will teach are clearance AirMove's to position the robot in preparation for the cutting. The primary means of moving the collaborative robot and the plasma cutting head to the work material is via the programming button that releases the robot into a hand-guided jogging mode where the operator/programmer can push/pull the robot into the appropriate position. When the operator/programmer starts positioning the collaborative robot, he/she ensures they have a cutting or assembly print that will be used to identify shape and location of the cutting to be performed on the work material. If the desired work material will vary in positional location or the collaborative robot is moved to the work material, tactile searching/sensing is needed to ensure the trajectory of the collaborative robot is properly placed in the joint considering this variation. If one of these conditions exists, the operator/programmer plans out the searching scheme and where the offsets will be needed for the cutting process that will be performed on the work material.

If searches are needed, the operator/programmer zeros out stored searches treating this part as the baseline part for correlation of searches to all subsequent cut templates. Once the operator/programmer has added in searches and appropriate offset activation, the appropriate cut templates can be added. Each of the cuts may be a shape cut such as a slot, square, rectangle, circle, etc. or a free multisegmented path cut based on the cutting or assembly print. The various types of cuts will be added using the built in programming tools for each particular type of cut that is added. Once the cuts have been added to the program, the operator/programmer selects the appropriate cutting process, and if the appropriate cutting process is not already saved in the system, it will be developed using an existing set of data that is adjusted by increasing or decreasing the travel speed while adjusting amperage based on the thickness. This process of adding searches, if needed, and cut templates is repeated for all necessary cuts across the work material. Between each of these sets of searches and cut templates, any necessary AirMove's will be added for clearance or conduit bundle cable management. Once all necessary moves have been added to the collaborative robot, the operator/programmer saves the program in the robot for future repetitive use. In either case, where the work material was brought to the collaborative robot or the robot was taken to the work material, the position of the collaborative robot relative to the work material must be recorded or outlined on the floor.

Referring initially to FIGS. 1-9, an exemplary highly-mobile collaborative robot welding system, referred to hereinafter as the welding system for purposes of brevity, is shown generally at the number 100. The welding system includes a mobile platform, base, or cart 115, as the terms may be used interchangeably herein, having a frame 117, a plurality of supporting legs 120 operatively connected to the frame, each of the plurality of supporting legs including a levelling device or foot 121 attached thereto, a bottom or lower storage area or platform 124 operatively connected to each of the plurality of supporting legs and having wheels or casters 125 mounted to a bottom surface 127 thereof, a first and a second adjacent workstations 126, 128 separated by an arc flash guard 130, each workstation including a gridded upper work surface or table 129, and one or more handles 114 operatively connected to the frame 117 and extending outwardly therefrom, the handles being adapted to permit an operator to move the system to a designated location for performing fabrication operations such as welding or cutting, as the case may be. Each gridded upper work surface includes a plurality of apertures 30 formed therein, each of the apertures being adapted to releasably receive a clamp or other securement device for holding a workpiece, fixture or weld assembly in a fixed position during the performance of a welding sequence using the welding system.

The welding system 100 further includes at least one programmable collaborative robot system 50 (known in the art as a cobot), such as a Universal Robots™ UR10e collaborative industrial robot. However, it is to be understood that collaborative robot systems either specifically designed and built for individual applications or other generally commercially available collaborative robot systems may also be used without departing from the scope of the present invention. The collaborative robot system comprises a robot arm 55 operatively connected to a base 57, which, in turn, is mounted on an electrically isolating pad 60 positioned intermediate the base and a mounting bracket operatively connected to the mobile base or cart. In an embodiment, the robot arm, the base and the electrically isolating pad are secured by suitable fasteners 51 to a mounting bracket in the form of a cantilevered riser 52 mounted to the cart 115 and an upper flexible edge 132 of the arc flash guard 130. The robot arm includes a plurality of arm segments 65*a*-65*f* sequentially pivotally and/or rotatably interconnected to one another and structured and arranged to have a reach length or distance which depends upon the size of the robot arm selected for use in the system 50 and the lengths of its individual segments. A material processing implement in the form of a welding or cutting implement or torch 70 is secured via an attachment 72 to a distal end 75 of the robot arm, the implement being universally positionable and translatable along a preselected weld or cut path in response to instructions from a robot controller, teach pendant and application programming interface (API) display shown collectively at 80. In the embodiments of FIGS. 1-9, by way of example and not of limitation, the implement 70 is depicted in the form of a welding torch representative of the type used in Gas Metal Arc Welding (GMAW) processes; however, it is to be understood that the system of the present invention may be used with any materials joining or cutting process without departing from the scope of the present invention. It is to be understood that the system 100 may be used for cutting applications by replacing the welding implement 70 with a plasma cutting torch or other cutting implements needed for a particular cutting application.

Welding consumables such as protective shielding gas, cutting gas, granular flux material and welding wire 81 are delivered to the welding implement via conduit or welding torch bundle 82 secured to the robot arm by conduit or bundle management brackets 83. The wire is stored in a suitable wire storage apparatus such as a drum or, by way of example and not of limitation, on a wire spool 84 and fed by a wire feed mechanism 86 from the spool through the conduit or bundle and to a weld joint assembly via a weld nozzle 88.

A programming or hand-guided jog button 92 is secured to the attachment 72 and is operatively connected to the robot controller and teach pendant and is adapted to allow an operator to set up and program the welding system in an intuitive and graphical manner. Shielding gas is delivered from a central gas supply system or from individual gas cylinders via the torch bundle to the weld nozzle, as is known in the art. Power is provided to the welding or cutting implement via power supply 95 mounted on the storage area or platform 124 of the cart 115 and system cooling is provided by a water cooling apparatus (not shown) as may be needed for larger welding applications where generated heat may require faster dissipation than is available via air cooling. In an embodiment, a water cooling apparatus may also be mounted on storage area or platform 124. The power supply, robot controller, teach pendant, wire feed mechanism, and any ancillary power tools an operator may need all may be operatively connected to single phase power, for example, 120V power for the collaborative robot system and 240V power for the power supply. Optionally, the power supply may be connected to 208V, 480V or 575V three phase power.

The availability of conventional shop power combined with the portability of the worktable contribute to the overall flexibility and adaptability of the welding system. It can be brought to the location of the work material and set up anywhere in a shop or in the field quickly with little lead time. The welding system of the foregoing embodiments mounted on the mobile platform or cart 115 occupies a small area having a reduced system footprint compared to conventional fully-platformed robots and does not require a large investment in utilities, dedicated factory space, safety guards and materials handling equipment. The welding system of the present invention is particularly adaptable for the fabrication of large assemblies having welded joints located in difficult to reach areas and at elevated positions.

Figure 5:
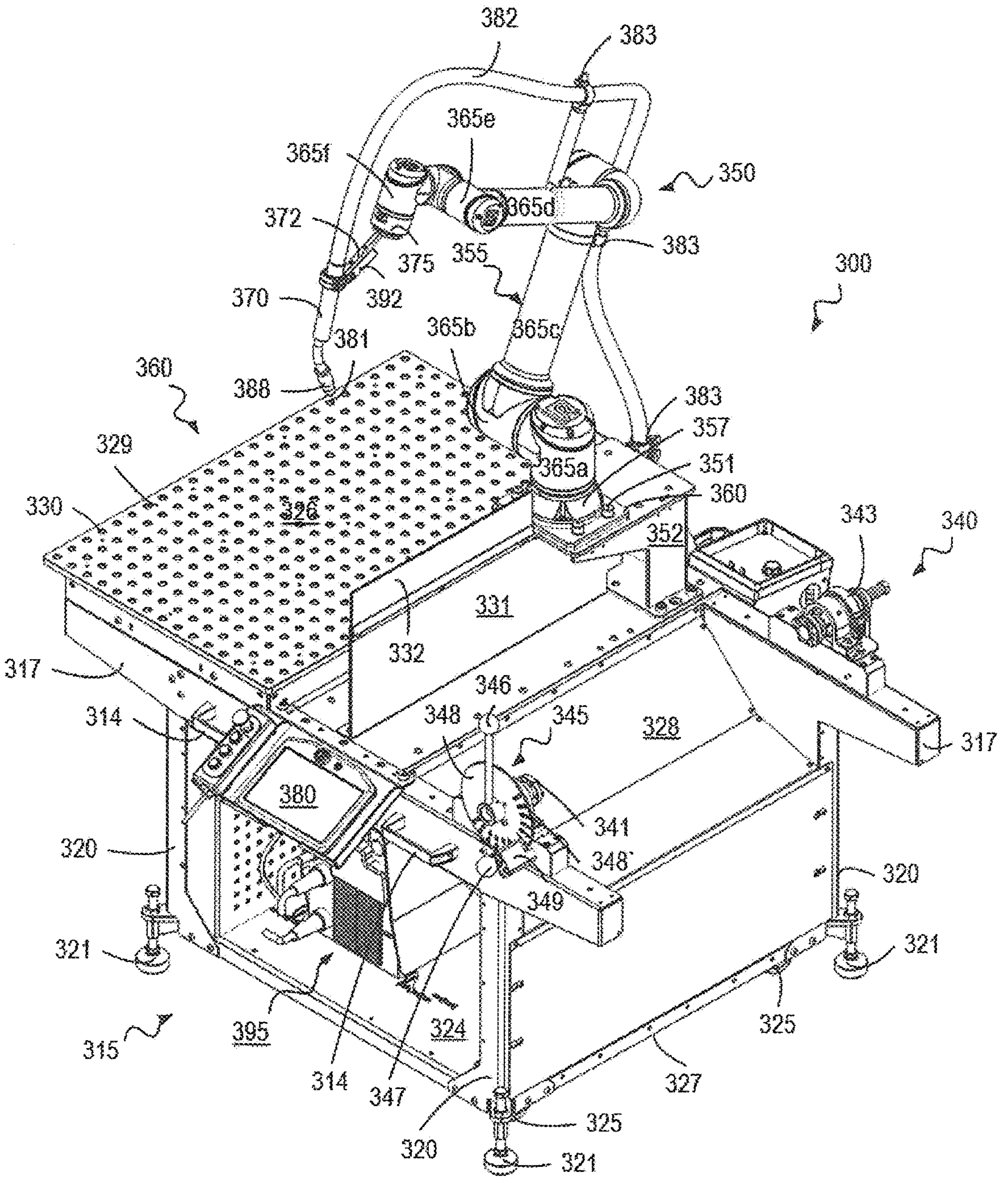
FIG. 5 is a front top perspective view of a highly-mobile collaborative robot welding system having at least one workstation configured to perform welding operations on a cylindrically shaped workpiece and a work holding apparatus adapted to hold a cylindrical workpiece in accordance with an embodiment of the present invention.
Figure 6:
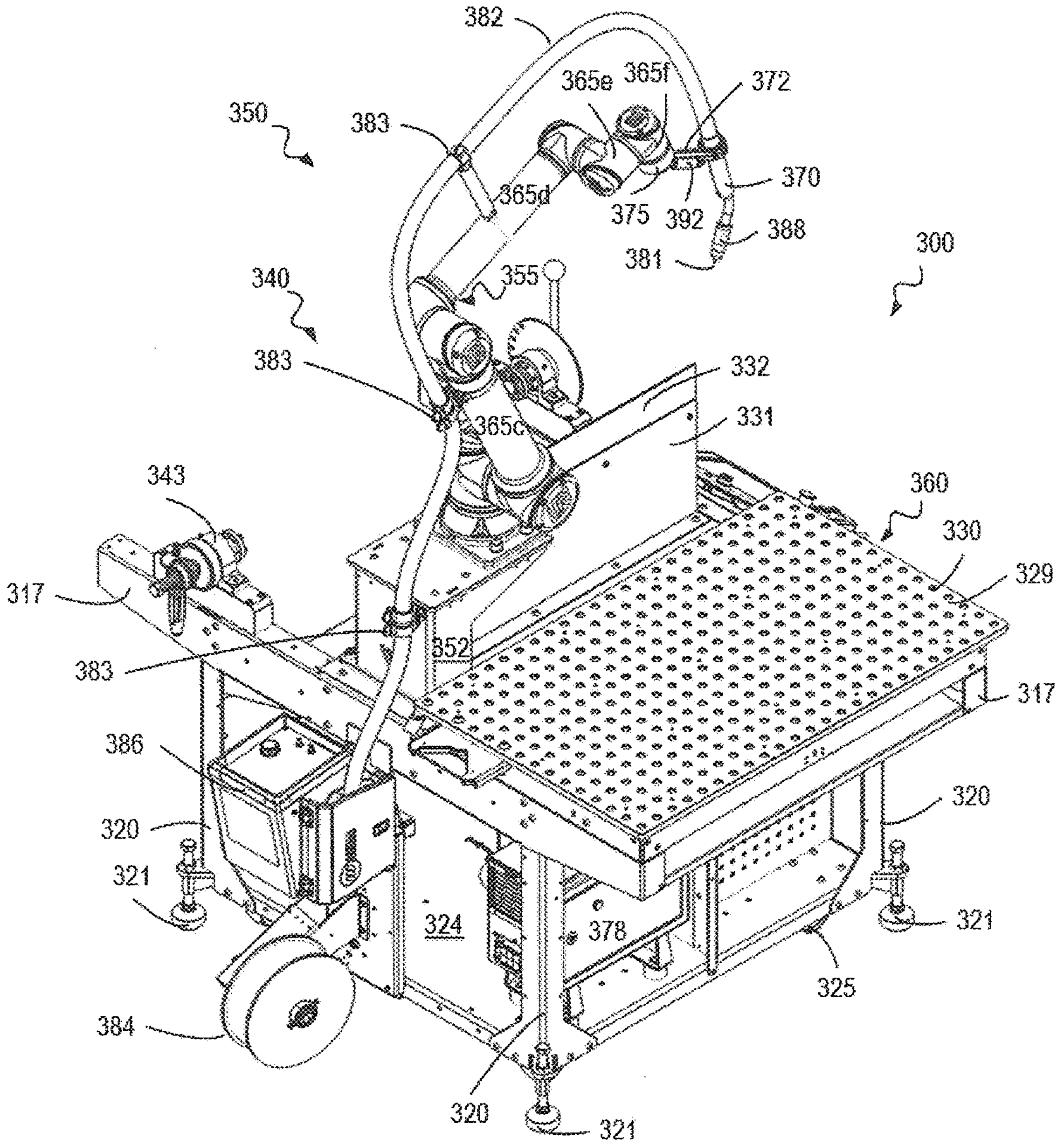
FIG. 6 is a rear top perspective view of the highly-mobile collaborative robot welding system of FIG. 5 in accordance with an embodiment of the present invention.

Referring now to FIGS. 5 and 6, a highly-mobile multi-station collaborative robot welding system 300 is shown, the system having one workstation 326 adapted to perform fabrication operations on piece parts or assemblies positioned thereon and one workstation 328 configured to perform welding operations on elongated or cylindrically shaped workpieces (not shown) held in position by a work holding apparatus 340.

Similar in configuration to the system 100 disclosed in the embodiment of FIGS. 1-4, system 300 includes a mobile platform or cart 315 having a frame 317, a plurality of supporting legs 320, each including a levelling device or foot 321 attached thereto, a storage area or platform 324 having wheels or casters 325 mounted to a bottom surface 327 thereof, a first and a second adjacent workstation 326, 328 respectively separated by an arc flash guard 331. Workstation 326 includes a gridded upper work surface or table 329, and one or more handles 314 operatively connected to the frame 317 and extending outwardly therefrom, the handles being adapted to permit an operator to move the system to a designated location for performing fabrication operations such as welding or cutting, as the case may be. Upper work surface 329 includes a plurality of apertures 30 formed therein, each of the apertures being adapted to releasably receive a clamp or other securement device for holding a workpiece, fixture or weld assembly in a fixed position during the performance of a welding sequence using the welding system.

Workstation 328 is configured to perform welding or cutting operations on a cylindrically shaped or elongate workpiece and includes a work holding apparatus 340 adapted to hold an elongated workpiece such as a cylindrical workpiece. The work holding apparatus 340 includes a headstock 341 and a tailstock 343, each adapted to releasably engage and hold a workpiece during processing. Headstock 341 further includes a rotational positioning device 345 which includes a positioning member or handle 346 operatively connected to a lock mechanism 347. The lock mechanism comprises an indexing disk 348 having a plurality of equally spaced apart indexing slots 348' formed therein, each slot being adapted to receive a spring biased locking member 349 therein. The slots and the pin cooperate with one another to maintain a workpiece in a preselected position while welding or cutting operations are being performed thereon.

The welding system 300 further includes a collaborative robot system 350 (known in the art as a cobot), such as a Universal Robots™ UR10e collaborative industrial robot. However, it is to be understood that collaborative robot systems either specifically designed and built for individual applications or other generally commercially available collaborative robot systems may also be used without departing from the scope of the present invention. The collaborative robot system comprises a robot arm 355 operatively connected to a base 357, which, in turn, is mounted on an electrically isolating pad 360 secured by suitable fasteners 351 to a cantilevered riser 352 mounted to the cart 315 and an upper flexible edge 332 of the arc flash guard 331. The robot arm includes a plurality of arm segments **365*a*-365*f* sequentially pivotally and/or rotatably interconnected to one another and structured and arranged to have a reach length or distance which depends upon the size of the robot arm selected for use in the system 350 and the lengths of its individual segments. A built-in safety feature (not shown) in the robot arm is structured and arranged to interrupt movement of the arm, should it come in contact with the operator or another object. A welding or cutting implement or torch 370 is secured via an attachment 372 to a distal end 375 of the robot arm, the implement being universally positionable and translatable along a preselected weld or cut path in response to instructions from a robot controller or teach pendant including an application programming interface (API) display shown collectively at 380. In the embodiments of FIGS. 1-9, by way of example and not of limitation, the implement 370 is depicted in the form of a welding torch representative of the type used in Gas Metal Arc Welding (GMAW) processes; however, it is to be understood that the system of the present invention may be used with any materials joining or cutting process without departing from the scope of the present invention. It is to be understood that the system 300 may be used for cutting applications by replacing the welding implement 370** with a plasma cutting torch or other cutting implements needed for a particular cutting application.

Welding consumables such as protective shielding gas, cutting gas, granular flux material and welding wire 381 are delivered to the welding implement via conduit or welding torch bundle 382 secured to the robot arm by conduit or bundle management brackets 383. The wire is stored in a suitable wire storage apparatus such as a drum or, by way of example and not of limitation, on a wire spool 384 and fed by a wire feed mechanism 386 from the spool through the conduit or bundle and to a weld joint assembly via a weld nozzle 388.

A programming or hand-guided jog button 392 is secured to the attachment 372 and is operatively connected to the robot controller and teach pendant and is adapted to allow an operator to set up and program the welding system in an intuitive and graphical manner. Shielding gas is delivered from a central gas supply system or from individual gas cylinders via the torch bundle to the weld nozzle, as is known in the art. Power is provided to the welding or cutting implement via power supply 395 mounted on the storage area or platform 324 of the cart 315 and system cooling is provided by a water cooling apparatus (not shown) as may be needed for larger welding applications where generated heat may require faster dissipation than is available via air cooling. In an embodiment, a water cooling apparatus may also be mounted on storage area or platform 324. The power supply, robot controller, teach pendant, wire feed mechanism, and any ancillary power tools an operator may need all may be operatively connected to single phase power, for example, 120V power for the collaborative robot system and 240V power for the power supply. Optionally, the power supply may be connected to 208V, 480V or 575V three phase power.

Figure 7:
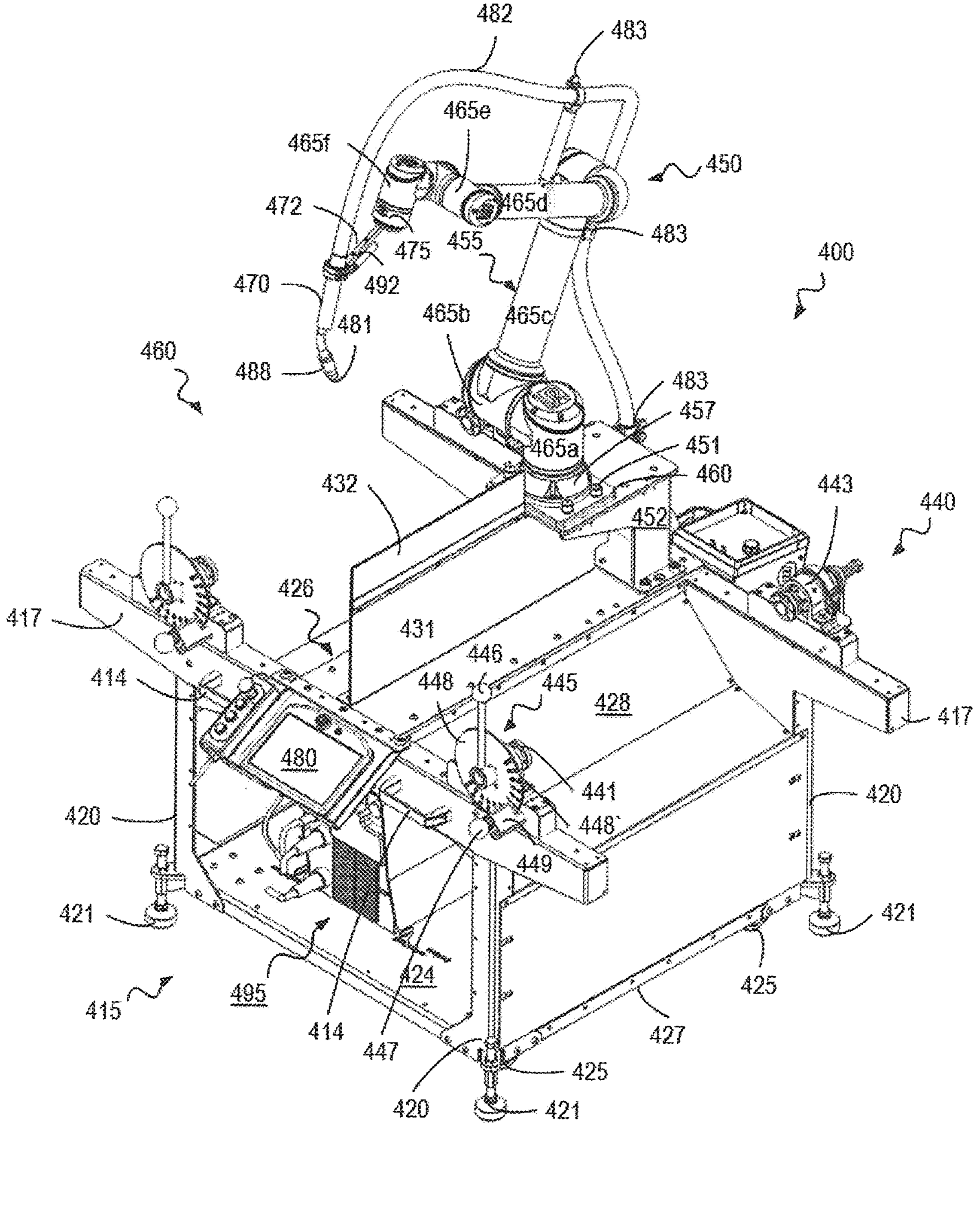
FIG. 7 is a front top perspective view of a highly-mobile collaborative robot welding system having two workstations configured to perform welding operations on a cylindrically shaped workpiece, each workstation including a work holding apparatus adapted to hold a cylindrical workpiece in accordance with an embodiment of the present invention.
Figure 8:
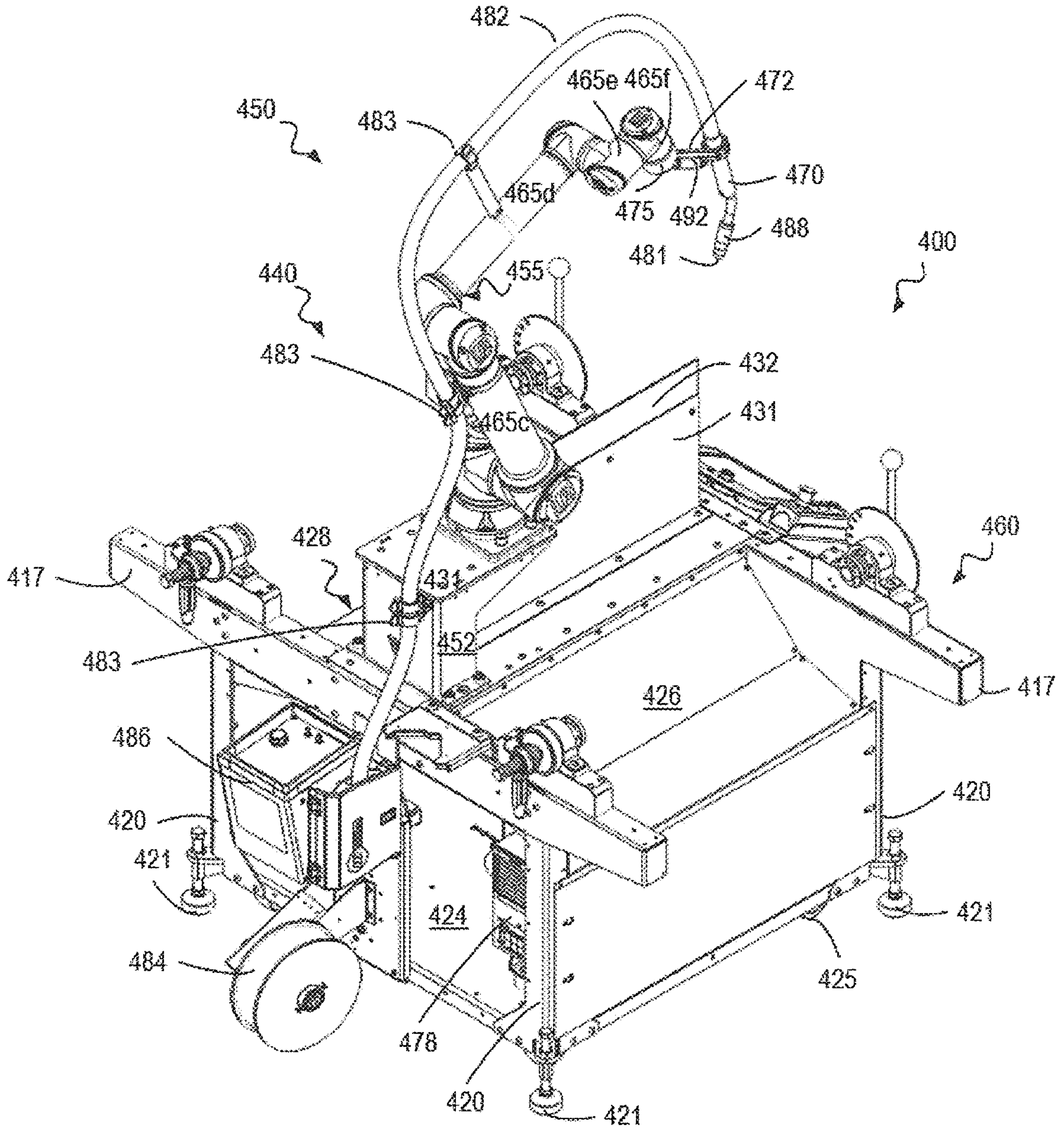
FIG. 8 is a rear top perspective view of the highly-mobile collaborative robot welding system of FIG. 7 in accordance with an embodiment of the present invention.

FIGS. 7 and 8, illustrate a highly-mobile multi-station collaborative robot welding system 400 is shown, the system having first and second workstations 426 and 428 both configured to perform welding operations on elongated or cylindrically shaped workpieces (not shown) held in position by a work holding apparatus 440. Similar in configuration to the system 100 disclosed in the embodiment of FIGS. 1-4 and system 300 disclosed in FIGS. 5 and 6, system 400 includes a mobile platform or cart 415 having a frame 417, a plurality of supporting legs 420, each including a levelling device or foot 421 attached thereto, a storage area or platform 424 having wheels or casters 425 mounted to a bottom surface 427 thereof, a first and a second adjacent workstation 426, 428 respectively separated by an arc flash guard 431. Each workstation includes one or more handles 414 operatively connected to the frame 417 and extending outwardly therefrom, the handles being adapted to permit an operator to move the system to a designated location for performing fabrication operations such as welding or cutting, as the case may be.

Both workstations 426, 428 are configured to perform welding or cutting operations on a cylindrically shaped or elongate workpiece and include a work holding apparatus 460 and 440 respectively adapted to hold an elongated workpiece such as a cylindrical workpiece. The work holding apparatus 440 includes a headstock 441 and a tailstock 443, each adapted to releasably engage and hold a workpiece during processing. Headstock 441 further includes a rotational positioning device 445 which includes a positioning member or handle 446 operatively connected to a lock mechanism 447. The lock mechanism comprises an indexing disk 448 having a plurality of equally spaced apart indexing slots 448' formed therein, each slot being adapted to receive a spring biased locking member 449 therein. The slots and the pin cooperate with one another to maintain a workpiece in a preselected position while welding or cutting operations are being performed thereon.

The welding system 400 further includes a collaborative robot system 450 (known in the art as a cobot), such as a Universal Robots™ UR10e collaborative industrial robot. However, it is to be understood that collaborative robot systems either specifically designed and built for individual applications or other generally commercially available collaborative robot systems may also be used without departing from the scope of the present invention. The collaborative robot system comprises a robot arm 455 operatively connected to a base 457, which, in turn, is mounted on an electrically isolating pad 460 secured by suitable fasteners 451 to a cantilevered riser 452 mounted to the cart 415 and an upper flexible edge 432 of the arc flash guard 431. The robot arm includes a plurality of arm segments *465a-465f* sequentially pivotally and/or rotatably interconnected to one another and structured and arranged to have a reach length or distance which depends upon the size of the robot arm selected for use in the system 450 and the lengths of its individual segments. A built-in safety feature (not shown) in the robot arm is structured and arranged to interrupt movement of the arm, should it come in contact with the operator or another object. A welding or cutting implement or torch 470 is secured via an attachment 472 to a distal end 475 of the robot arm, the implement being universally positionable and translatable along a preselected weld or cut path in response to instructions from a robot controller, teach pendant and application programming interface (API) display shown collectively at 480. As noted above, in the embodiments of FIGS. 1-9, by way of example and not of limitation, the implement 470 is depicted in the form of a welding torch representative of the type used in Gas Metal Arc Welding (GMAW) processes; however, it is to be understood that the system of the present invention may be used with any materials joining or cutting process without departing from the scope of the present invention. It is to be understood that the system 400 may be used for cutting applications by replacing the welding implement 470 with a plasma cutting torch or other cutting implements needed for a particular cutting application.

Welding consumables such as protective shielding gas, cutting gas, granular flux material and welding wire 481 are delivered to the welding implement via conduit or welding torch bundle 482 secured to the robot arm by conduit or bundle management brackets 483. The wire is stored in a suitable wire storage apparatus such as a drum or, by way of example and not of limitation, on a wire spool 484 and fed by a wire feed mechanism 486 from the spool through the conduit or bundle and to a weld joint assembly via a weld nozzle 488.

A programming or hand-guided jog button 492 is secured to the attachment 472 and is operatively connected to the robot controller and teach pendant and is adapted to allow an operator to set up and program the welding system in an intuitive and graphical manner. Shielding gas is delivered from a central gas supply system or from individual gas cylinders via the torch bundle to the weld nozzle, as is known in the art. Power is provided to the welding or cutting implement via power supply 495 mounted on the storage area or platform 424 of the cart 415 and system cooling is provided by a water cooling apparatus (not shown) as may be needed for larger welding applications where generated heat may require faster dissipation than is available via air cooling. In an embodiment, a water cooling apparatus may also be mounted on storage area or platform 424. The power supply, robot controller, teach pendant, wire feed mechanism, and any ancillary power tools an operator may need all may be operatively connected to single phase power, for example, 120V power for the collaborative robot system and 240V power for the power supply. Optionally, the power supply may be connected to 208V, 480V or 575V three phase power.

Figure 9:
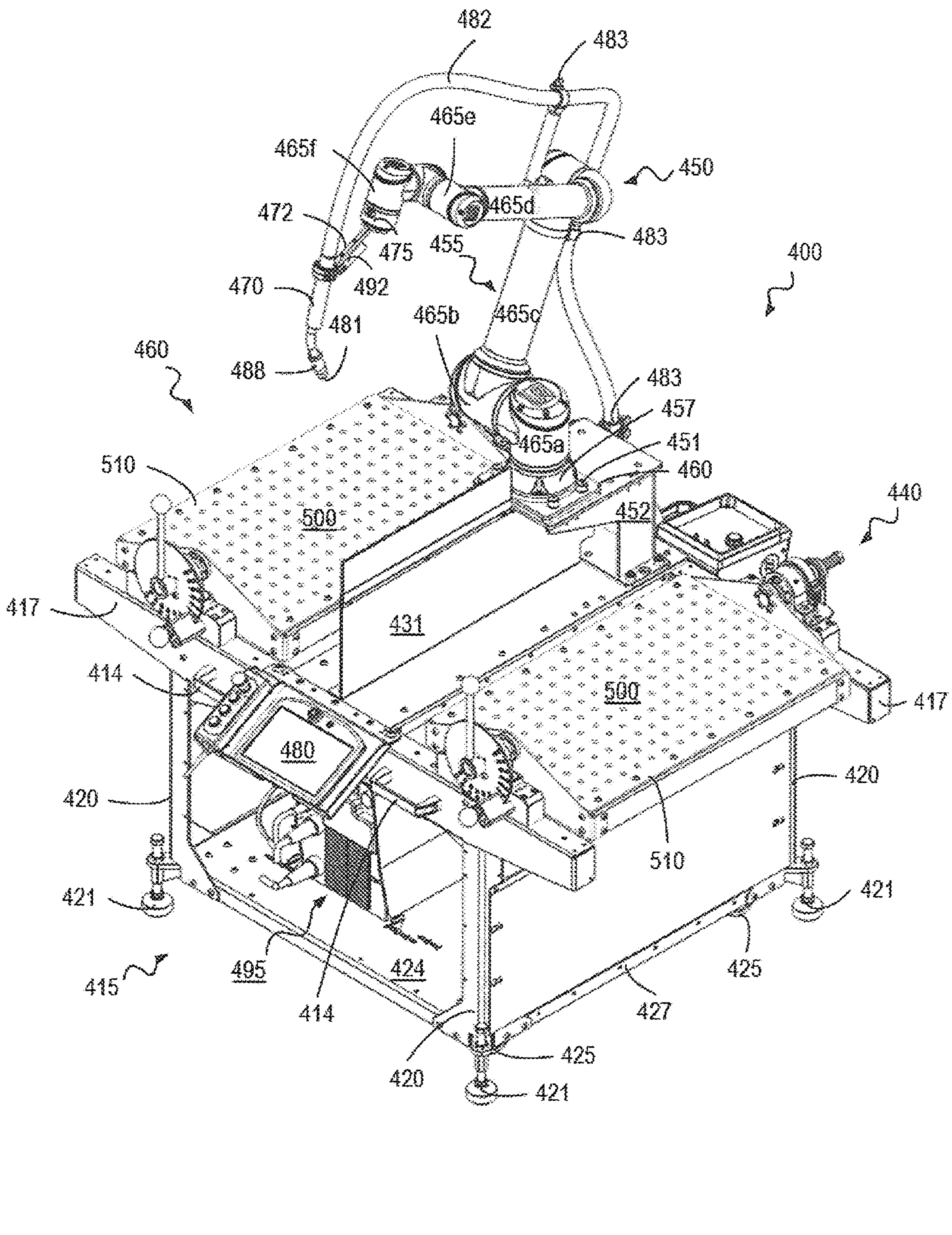
FIG. 9 is a front top perspective view of a highly-mobile collaborative robot welding system having two separate workstations, each having a gridded planar worksurface and a work holding apparatus adapted to hold cylindrical workpieces in accordance with an embodiment of the present invention.

FIG. 9 shows the system 400 of FIGS. 7 and 8 having a gridded upper work surface or table 500 operatively connected to the frame 417. Each upper work surface or table 500 includes a plurality of apertures 510 formed therein, each of the apertures being adapted to releasably receive a clamp or other securement device for holding a workpiece, fixture or weld assembly in a fixed position during the performance of a welding sequence using the welding system While only selected embodiments have been chosen to illustrate the present invention, it will be apparent to those skilled in the art from this disclosure that various changes and modifications can be made herein without departing from the scope of the invention as defined in the appended claim. Furthermore, the foregoing descriptions of the embodiments according to the present invention are provided for illustration only, and not for the purpose of limiting the invention as defined by the appended claim and its equivalents.

What is claimed is:

1. A highly-mobile deployable multi-station collaborative robot fabrication system (fabrication system) for performing welding or cutting tasks in fabrication shop, in factory environments or on large structures in difficult to access or elevated locations, the fabrication system comprising:

a mobile base having first and second adjacent workstations;

a flash guard operatively connected to the mobile base intermediate the first and second workstations;

at least one programmable collaborative robot system operatively connected to the mobile base, the at least one programmable collaborative robot system including a robot arm, a base operatively connected to the robot arm, and an electrically isolating pad positioned intermediate the base and a mounting bracket operatively connected to the mobile base or cart, the mounting bracket comprising a cantilevered riser mounted to the mobile base or cart and an upper flexible edge of the flash guard;

a material processing implement operatively connected to the at least one programmable collaborative robot system;

a power supply operatively connected to the material processing implement; and a control system including a robot controller and a teach pendant having an application programming interface (API) display.

2. The highly-mobile deployable multi-station collaborative robot fabrication system of claim 1 wherein the control system includes a programming or hand-guided jog button operatively connected to the robot controller and teach pendant and adapted to allow an operator to set up and program the fabrication system in an intuitive and graphical manner.

3. The highly-mobile deployable multi-station collaborative robot fabrication system of claim 2 wherein the mobile base comprises:

a frame operatively connected to and adapted to support the first and second adjacent workstations;

a plurality of supporting legs operatively connected to the frame, each of the plurality of supporting legs including a levelling device or foot operatively connected thereto;

a storage area or platform operatively connected to each of the plurality of supporting legs, the storage area or platform having wheels or casters mounted to a bottom surface thereof.

4. The highly-mobile deployable multi-station collaborative robot fabrication system of claim 3 wherein each of the first and second adjacent workstations includes a gridded upper work surface or table and one or more handles operatively connected to the frame and extending outwardly therefrom, the handles being adapted to permit an operator to move the system to a designated location for performing fabrication operations.

5. The highly-mobile deployable multi-station collaborative robot fabrication system of claim 4 wherein each gridded upper work surface or table includes a plurality of apertures formed therein, each of the apertures being adapted to releasably receive a clamp or other securement device for holding a workpiece, fixture or assembly in a fixed position during the performance of a fabricating sequence.

6. The highly-mobile deployable multi-station collaborative robot fabrication system of claim 1 wherein the at least one programmable collaborative robot system comprises a robot arm including a plurality of arm segments sequentially pivotally and/or rotatably interconnected to one another and structured and arranged to have a preselected reach length or distance.

7. The highly-mobile deployable multi-station collaborative robot fabrication system of claim 1 wherein the material processing implement is a welding torch.

8. The highly-mobile deployable multi-station collaborative robot fabrication system of claim 1 wherein the material processing implement is a cutting torch.

9. The highly-mobile deployable multi-station collaborative robot fabrication system of claim 1 wherein one of the first and second adjacent workstations includes a gridded upper work surface or table adapted to perform fabrication operations on piece parts or assemblies positioned thereon and the other one of the first and second adjacent workstations includes a work holding apparatus configured to support elongated or cylindrically shaped workpieces while fabrication operations are performed thereon.

10. The highly-mobile deployable multi-station collaborative robot fabrication system of claim 9 wherein the work holding apparatus includes a headstock and a tailstock, each adapted to releasably engage and hold a workpiece during processing.

11. The highly-mobile deployable multi-station collaborative robot fabrication system of claim 10 wherein the headstock further includes a rotational positioning device including a lock mechanism, the lock mechanism further having a positioning member or handle operatively connected thereto.

12. The highly-mobile deployable multi-station collaborative robot fabrication system of claim 11 wherein the lock mechanism comprises an indexing disk having a plurality of equally spaced apart indexing slots formed therein, each slot being adapted to receive a spring biased locking member or pin therein, the slots and the pin cooperating with one another to maintain a workpiece in a preselected position while fabricating operations are being performed thereon.

13. The highly-mobile deployable multi-station collaborative robot fabrication system of claim 1 wherein both the first and the second adjacent workstations configured to perform welding operations on elongated or cylindrically shaped workpieces held in position by a work holding apparatus.

14. The highly-mobile deployable multi-station collaborative robot fabrication system of claim 1 wherein each of the first and second adjacent workstations includes a gridded upper work surface or table and one or more handles operatively connected to the frame and extending outwardly therefrom, the handles being adapted to permit an operator to move the system to a designated location for performing fabrication operations and wherein both the first and the second adjacent workstations are further configured to perform welding operations on elongated or cylindrically shaped workpieces held in position by a work holding apparatus.

* * * * *